Oct. 4, 1966  R. E. RAHAUSER  3,276,633
MULTIPLE FLAVOR MIXING MACHINE FOR FROZEN CONFECTIONS
Filed Jan. 10, 1964  3 Sheets-Sheet 1

INVENTOR.
ROBERT E. RAHAUSER
BY
ATTORNEY

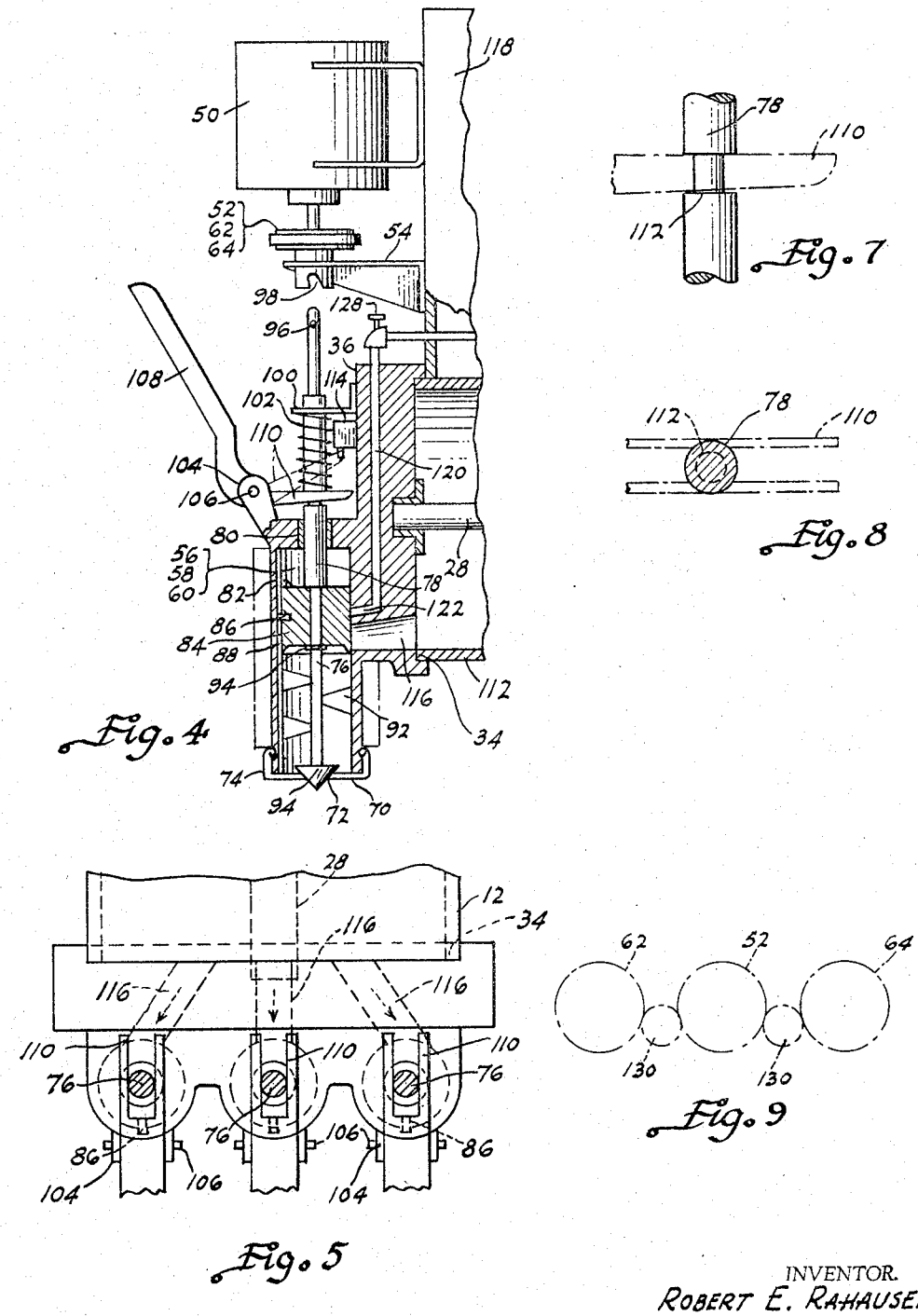

Oct. 4, 1966     R. E. RAHAUSER     3,276,633
MULTIPLE FLAVOR MIXING MACHINE FOR FROZEN CONFECTIONS
Filed Jan. 10, 1964     3 Sheets-Sheet 3

INVENTOR.
ROBERT E. RAHAUSER
BY
ATTORNEY

United States Patent Office 3,276,633
Patented Oct. 4, 1966

1

3,276,633
MULTIPLE FLAVOR MIXING MACHINE FOR
FROZEN CONFECTIONS
Robert E. Rahauser, 1131 Locust Grove Road, York, Pa.
Filed Jan. 10, 1964, Ser. No. 336,963
20 Claims. (Cl. 222—129.1)

This invention pertains to a mixing machine primarily intended for attachment to the freezing compartment of an appropriate type of standard freezer unit for making milk shakes, soft ice cream or frozen custard, slush drinks, or the like. Such standard type of freezer comprises a suitable cylinder or similar chamber for holding a frozen confection in chilled and preferably semi-viscous condition until ready for discharge into a container to be sold to a customer.

In various types of concession stands where food and frozen confections are dispensed at present, various types of frozen confections of different flavors are available. However, particularly in regard to making milk shakes, soft ice cream or frozen custards, as well as slush drinks, it is customary to have a separate mixing, chilling or freezing, and storage chamber for each different flavor. Considering the fact that each of these chambers must be insulated and contain freezing or chilling means, an agitator, and power means to drive the agitator, providing a plurality of such chamber for a substantial number of flavors comprises a very substantial capital investment.

The principal object of the present invention is to provide a multiple flavor mixing machine or head attachable to the delivery end of a conventional frozen or chilled confection mixing and storage chamber of the conventional type presently in use. In accordance with the principles of the invention, by providing a suitable head structure in which a plurality of relatively small mixing compartments are provided respectively for different flavors of frozen or chilled confections, it is possible by attaching such head to the delivery end of a conventional frozen confection mixing and storage chamber, which also freezes certain types of confections, if desired, to draw a desired amount of relatively neutral flavored frozen confection from the freezing and storage chamber into one of the relatively small mixing compartments incident to delivering a desired amount of selected flavoring material to said mixing compartment for mixing with the neutral flavored confection and thereby impart the desired flavor thereto, followed by discharge of the now-flavored confection from such mixing compartment.

Another object of the invention is to provide a multiple flavor mixing head of the type referred to above in which there preferably is a common drive means for the mixing agitators in each mixing compartment of the head, thereby minimizing power consumption and total cost of construction, the dimensions of the mixing compartments preferably being relatively small, whereby a suitable number of such compartments can be placed in relatively close relationship within the common head and thereby minimize the amount of spaces required to accommodate an appropriate number of such compartments.

Still another object of the invention is to provide simple actuating means, such as a manually-actuated pivoted handle which performs a plurality of functions including the opening of the inlet valves from the freezing chamber for the neutral confection to flow into a selected mixing chamber, and also interengage the agitator member of the selected mixing chamber with the power means to rotate it, while preferably all of the other mixing chambers remain idle, the interengaging of the agitator member with the power means also preferably opening the discharge port for the mixing compartment, whereby flavored frozen or chilled confection is progressively discharged as long as the inlet valve remains open and the agitator member continues to rotate.

Still another object of the invention is to provide means automatically to feed a regulated amount of flavoring material progressively to the selected mixing compartment from appropriate reservoirs for different flavors of flavoring material, there being one mixing compartment for each different flavor of flavoring material.

A still further object of the invention is to provide power means to drive the rotatable beater in the freezing chamber for the neutral frozen or chilled confection, said power means being energized incident to the inlet valve from said chamber to a selected mixing compartment being opened and the agitator member in said compartment being rotatably moved.

Details of the foregoing objects and of the invention, as well as other objects thereof, are set forth in the following specification and illustrated in the accompanying drawings comprising a part thereof.

In the drawings:

FIG. 4 is a fragmentary vertical elevation, partly in vertical section, showing the mechanism illustrated at the right-hand end of FIG. 1 but shown on a larger scale than in FIG. 1 for purposes of more clearly showing details of the structure.

FIG. 5 is a fragmentary top plan view of the structure shown in FIG. 4.

FIG. 7 is a fragmentary detail of part of the agitator-lifting means shown in FIGS. 1 and 4.

FIG. 8 is a fragmentary horizontal sectional view as seen on the line 8—8 of FIG. 7.

FIG. 9 is a horizontal diagrammatic view of another embodiment of drive means different from that shown in FIG. 3.

Figure 1:
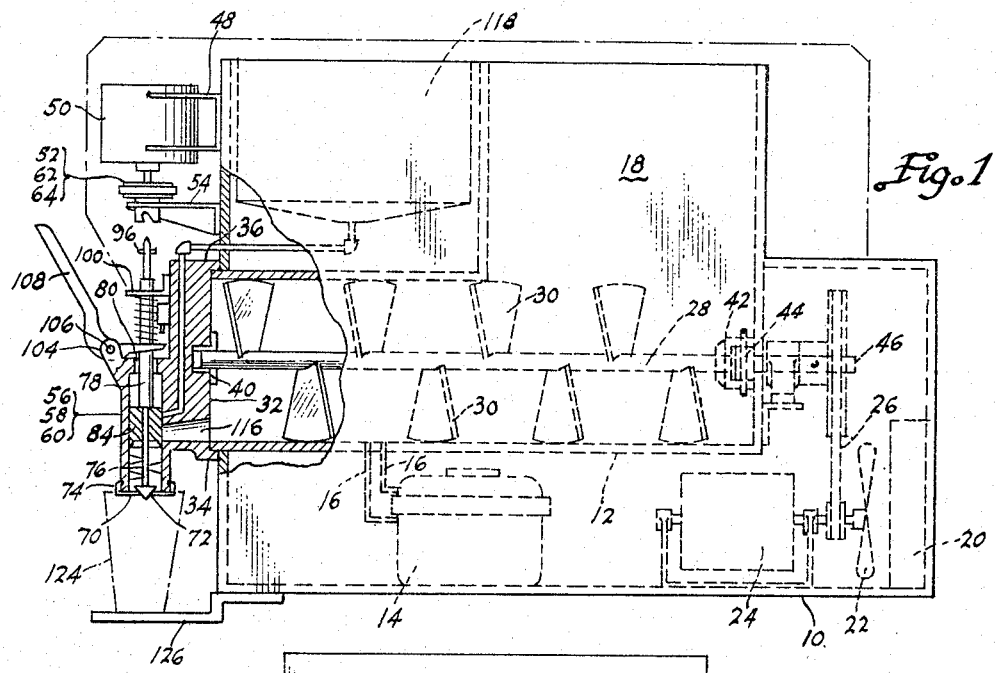
FIG. 1 is side elevation of a conventional freezing or chilling chamber for a frozen confection having a multiple flavor mixing head embodying the principles of the present invention connected to the delivery end of said chamber, part of said head being in vertical section to illustrate certain details thereof.

Referring to FIG. 1, there is illustrated therein a cabinet 10 containing a chilling or freezing chamber 12 which is suitably insulated in order to maintain chilling or freezing temperatures therein with a minimum consumption of power from appropriate refrigerating mechanism conventionally illustrated as comprising a compressor unit 14 having appropriate conduits 16 for feeding and returning refrigerating fluid to an appropriate freezing coil surrounding the chamber 12 in accordance with conventional practice. If desired, the chamber 12 may be cylindrical in cross-section, provided, for example, with a filling and storage portion 18 which preferably contains either chilled or frozen confection having substantially neutral flavor or, possibly, being flavored with vanilla or some other suitable flavor readily capable of having the flavor changed by the addition of an appropriate flavoring material thereto.

In accordance with the principles of the present invention, the mutiple flavor mixing head is intended to be used with a substantially conventional freezing chamber 12 and chilling or freezing mechanism associated therewith, generally of the type used at present to make soft ice cream, frozen custard, and the like. Also, mechanisms of this type are suitable for making milk shakes either from prepared mixes, or mixtures of suitable flavors of ice cream and milk, as well as slush drinks comprising primarily shaved ice and appropriate flavoring material.

The chamber freezing apparatus within the cabinet 10 also comprises an appropriate heat exchange unit or condensor 20 through which air is blown by fan 22 driven by an electric motor 24, the motor also preferably being connected through appropriate pulleys shown in FIG. 1 and connected by a driving belt or chain 26 to the rotatable beater shaft 28 provided with suitable angular beater blades 30 of conventional nature for purposes of agitating the mix within the chilling and freezing chamber 12 and particularly for feeding the same toward the exit end 32 of chamber 12.

The forward end of the cylindrical portion of freezing chamber 12, which is located adjacent the left-hand end of the illustration in FIG. 1, is a projecting end 34 to which a complementary multiple-flavor mixing head 36 is connected, preferably detachably, through the use of hand nuts 38, or the like, similar to the connecting means by which the closure heads of conventional frozen ice cream freezers are connected to the chambers thereof. The head 36 has a shallow socket within which the projecting end 34 of chamber 12 preferably is seated as clearly shown in FIG. 1. The head also has a forward bearing 40 which receives rotatably the forward end of beater shaft 28, while the rearward end thereof has an appropriate drive socket 42 co-engaging a pinned head 44 or other suitable means which is driven by short drive shaft 46 through the means of the pulleys and belt 26 which are powered by motor 24. Any other appropriate type of keying means between the drive shaft 46 and beater shaft 28 may be used, as desired.

Figure 2:
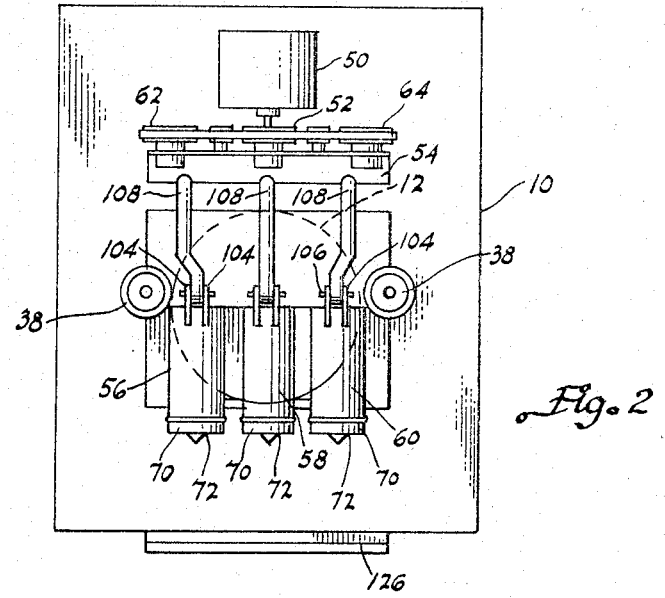
FIG. 2 is a front elevation of the mixing head and freezing chamber illustrated in FIG. 1.

Mounted preferably in the forward end of the cabinet 10 is a bracket 48 which supports another electric motor 50 clearly shown in FIGS. 1 and 2, the drive shaft of said motor being directly connected to a clutch type pulley 52 rotatably supported by bracket 54. In the exemplary embodiment illustrated in FIGS. 1 and 2, it is contemplated that the head 36 comprises three mixing compartments 56, 58 and 60. Accordingly, the bracket 54 supports two additional clutch pulleys 62 and 64 which are interconnected by an appropriate drive chain or flexible belt 66 in the exemplary manner shown in FIG. 3 in plan view. Such arrangement comprises a plurality of idler, tightener rollers or pulleys 68 which insure firm frictional engagement between the flexible drive means 66 and the various clutch pulleys, the arrangement also resulting in all of the clutch pulleys operating in the same radial direction.

The compartments 56, 58 and 60 preferably are cylindrical and the lower ends thereof are each closed by a detachable cover 70, each of the covers having a discharge port 72 therein. The covers may be detachably connected by any suitable means such as snap-type ears 74, details of which are best shown in FIG. 4.

Rotatably mounted within and extending coaxially above the upper end of each of the mixing compartments 56, 58 and 60 is agitating means comprising an agitator shaft 76 having a maximum diameter portion 78 intermediately of the ends thereof for slidable movement within a drive bushing 80. The lower end of portion 78 comprises an annular shoulder 82 which abuts the upper end of a combination plunger and gate valve 84 which is axially movable with the agitating shaft 76 but is non-rotatable relative to the mixing compartments 56–60, thereby minimizing frictional drive imposed upon the power mechanism to be described in detail hereinafter. For example, one means of preventing rotation between the plunger and gate valve 84 is to provide a guide pin 86 on the same vertically movable within a wide groove 88 formed within the wall of the mixing compartments for at least part of the length thereof.

The plunger and gate valve 84 are maintained in longitudinal position upon the agitating shafts 76 by suitable means such as a snap ring 90. The lower portion of the agitating shafts 76 also have impellers or agitating vanes 92 thereon for operation within the lower portion of the mixing compartments 56–60, the lower end of the agitating shaft 76 terminating in a vertical movable valve member 94 which is complementary to the discharge port 72 of each of the detachable covers 70.

The upper ends of each of the agitating shafts 76 are reduced in diameter and have disposed therethrough a transverse drive pin 96, the length of said pin preferably being no greater than the diameter of the portion 78 of each of the agitating shafts. Said drive pin is engageable with suitable clutch notches 98 in the lower ends of the hubs of the clutch pulleys 52, 62 and 64. The upper portions of the agitating shaft 76 also rotatably extend through a suitable upper bracket 100 which serves the dual function of bracing the operation of the agitating shaft 76 and also forming an upper abutment for one end of a compression spring 102.

The head 36 on the forward face thereof, is provided with a plurality of pairs of ears 104 which are provided with horizontally extending holes receiving pivot pins 106 which preferably are of a readily detachable nature, having a suitable snap end, or the like, which normally retains them removably in operative position. Supported between each pair of ears 104 is a manually operated handle 108 pivotally supported by the pins 106. The handle 104 is provided with a substantially horizontal yoke extension 110, the ears of the yoke 110 being disposed within an annular seat 112 formed in the portion 78 of each of the agitating shafts 76. The lower end of the springs 102 bears against the upper surface of the yoke extension 110 so as normally to hold the handle 108 in its most elevated position, somewhat similar to that illustrated in full lines in FIGS. 1 and 4.

The front face of the head 36 conveniently supports a switch 114, see FIG. 4, which is engageable by the outer extremity of one of the legs of the yoke extension 110, when the handle 108 is moved in counter-clockwise direction as indicated in FIG. 4, for purposes of energizing the electric motor 50. It will be understood that the motor and switch are connected by any simple circuit means of conventional type, not shown. The switch 114 also preferably is connected to the motor 24 for purposes of energizing the same simultaneously with the motor 50, for purposes to be described.

Extending through the head 36 between the interior of freezing chamber 12 and, preferably, the nearest adjacent wall of each of the mixing compartments 56–60, is a feed or entrance passage 116, the horizontal pipe line of which is somewhat diagrammatically shown in FIG. 5 and the side elevation of which is best shown in FIG. 4. Through these passages 116, neutral chilled or frozen confection, regardless of whether in the nature of milk shake composition, soft ice cream or frozen custard, or a slush drink comprising principally crushed ice, is delivered to the individual mixing compartments 56, 58 and 60. Normally, however, the outermost ends of the passages 116 are closed by reason of the plunger and gate valves 84 being in their lower, closing position as illustrated in FIGS. 1 and 4.

Also illustrated in FIGS. 1 and 4 is the storage and delivery means by which flavoring material is individually directed to each of the mixing compartments 56, 58 and 60. Such means comprises a plurality of one embodiment of storage compartments or reservoirs 118, these being shown in side elevation in FIGS. 1 and 4, and in front view, in FIG. 6. It is to be understood however, in regard to all of the foregoing description, as well as the illustrations in the figures, that while only three exemplary mixing compartments and reservoirs for flavoring material have been illustrated, the invention is by no means to be restricted to this specific number since it is apparent that as many mixing compartments and flavoring reservoirs may be provided, as desired, within reason. The essence of the present invention is that no matter how many of a reasonable number of different flavors of frozen confection are desired to be provided by a machine of the type illustrated and described herein, all of the mixing compartments for said different flavors are supplied with neutral confection material from a single freezing chamber or similar storage means provided with delivery mechanism for feeding such neutral confection selectively to the various mixing compartments.

Figure 6:
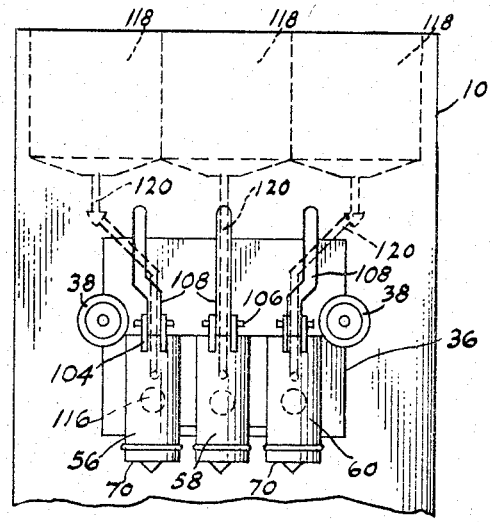
FIG. 6 is a front elevation of the structure shown in FIG. 1 and similar to that illustrated in FIG. 2 but showing the outline of the flavor tanks and the delivery means for flavoring material to the mixing compartments of the multiple flavor mixing head.

The embodiment of reservoirs for flavoring material shown in FIGS. 1, 4 and 6 makes the use of gravity for delivering the flavoring material from the reservoirs to the mixing compartments. To this end, appropriate feed tubes or channels 120 respectively extend between each of the reservoirs 118 and mixing compartments 56–60. Further, the lower or delivery ends of the flavoring conduits 120 are adjacent the delivery ends of the passages 116 for the neutral confection material, whereby the delivery ends of the conduits 120 likewise are closed by the plunger and gate valves 84 when in the lower position thereof illustrated in FIGS. 1 and 4.

OPERATION OF EMBODIMENT SHOWN IN FIGS. 1–8

Assume, for example, that different flavors of flavoring material are respectively disposed within the various flavoring reservoirs 118 and a suitable supply of basic chilled or frozen confection having either a neutral flavor or relatively bland flavor, other than possibly being sweet, has been prepared and is maintained in chilled or frozen condition within the freezing chamber 12. A customer desires a certain flavor of frozen confection. The clerk attending the machine pulls the handle 108 downward, toward the dotted line position shown in FIG. 4 for example to simultaneously perform a plurality of operations as follows.

The lowering of handle 108 elevates yoke extension 110 to raise the selected agitating shaft 76 so that the drive pin 96 in the upper end thereof engages the clutch notches 98 of the clutch pulley in alignment therewith. The raising of the yoke extension 110 also actuates switch 114 to simultaneously energize electric motor 50 and the other motor 24. Motor 50 rotates the clutch pulley to revolve the agitating shaft 76 and motor 24 rotates the beater shaft 28 to insure the feeding of neutral confection through the entrance passage 116 into the selected mixing compartment within head 36.

The elevation of the plunger and gate valve 84 will move the same away from obstructive position with respect to the entrance passage 116 for the neutral confection and the flavoring exits 122 from the conduits 120. The size of the exits 122 incidentally is gauged adequately to insure the proper delivery of a suitable amount of flavoring material from each of the individual reservoirs 118 commensurate with the amount of flavoring desired to be beaten into the neutral confection material, as controlled by the delivery rate of such neutral confection through the entrance passage 116 into the mixing compartment therefor.

The elevation of the agitating shaft 76 also results in commensurate elevation of the lower portion of the shaft 76 which has the agitating vanes 92 thereon, whereby the latter are substantially opposite the entrance openings through which the neutral confection and flavoring material enter the mixing compartment. Likewise, the valve member 94 is raised from the discharge port 72. The result of the foregoing operation is that a progressive and continual mixing of a frozen or chilled confection is achieved for a substantially indefinite period, if desired, or for such time as is required to fill an individual order. It will be understood that the confection may be discharged into any suitable type of exemplary container such as a paper cup 124 diagrammatically shown in FIG. 1 for example and supported by an appropriate shelf 126. The number of agitating vanes 92 is adequate to insure relatively fair mixing of the flavoring material with the chilled or frozen neutral confection material. Incidentally, the shape of the valve member 94 may be such as to somewhat impede the very free discharge of frozen confection through the discharge port 72, thereby insuring retaining of the confection within the lower portion of the mixing compartment until the flavoring has been quite thoroughly mixed throughout the total mass.

Although it is possible for the plunger and gate valves 84 to be made integrally with the agitating shafts 76 and thereby being rotatable therewith, such arrangement would impose substantial frictional drag, for example, between the bottom surface of the plunger and gate valves 84 and the confection being mixed within the mixing compartment. Accordingly, the preferred construction is as illustrated specifically in FIG. 4, whereby the plunger and gate valve 84 in each compartment is non-rotatable therein.

When a desired amount of flavored frozen or chilled confection has been formed by the machine, of any desired flavor as selected by the handle 108 which is pulled to initiate the entire operation described above, it is only necessary to release the handle 108 which has been actuated by the operator or clerk, whereupon the spring 102 depresses the yoke extension 110, thereby lowering the agitating shaft 76 and the plunger and gate valve 84 carried thereby to shut off any further delivery of neutral frozen or chilled confection as well as flavoring material, opening the switch 114 so as to stop further operation of motors 24 and 50, as well as closing the discharge port 72 through the lowering of the valve member 94 thereinto. At least the lower portion of the exterior of the head 36 is covered with insulating material somewhat diagrammatically illustrated in FIG. 4, whereupon the flavored confection material which remains in the lower portion of the mixing compartment following the closing of valve member 94 will remain in usable condition therein until that same flavor next is required, thereby insuring an initial supply of such flavored confection substantially instantly upon actuating the machine to furnish an additional supply of that same flavor.

CLEANING THE MACHINE AND MIXING HEAD

As is well-known in regard to dispensing food products and especially dairy products, frequent and satisfactory cleansing of the apparatus is essential. To this end, the present invention is especially adapted for quick and easy cleaning of the machine, as follows.

For convenience, each of the conduits 120 for flavoring material may be provided with a suitable shut-off valve 128, see FIG. 4. This may be either a simple needle-type valve, by which the rate of flow likewise may be regulated, or any other appropriate type of valve. The quickly detachable covers 70 are removed. Next, the pivot pins 106 are pulled from the ears 104 so as to permit quick removal of the handles 108 and their yoke extensions 110. The agitating shaft 76 and the plunger and gate valves carried thereby then are ready to be lowered, vertically, from the mixing compartment for complete cleansing thereof, this operation also exposing the interior of the mixing compartment for suitable cleansing by steam or the like. Due to the fact that the drive pin 96 is of no greater length than the diameter of the portion 78 of the agitating shafts 76, the upper end of the agitating shaft readily passes through the bearing opening in bracket 100 as well as guide bushing 80.

After all the agitating shafts and the plunger and gate valves carried thereby have been removed from the head 36, the head itself may quickly be removed from the front end of the freezing chamber 12 by releasing the hand nuts 38, whereupon the beater shaft 28 may be removed from the forward end of the chamber 12 for complete cleansing of the interior of said chamber. The interior of the flavor tanks may be cleansed by conventional means after draining the same whenever this is found to be necessary.

ADDITIONAL EMBODIMENTS OF THE INVENTION

Figure 3:
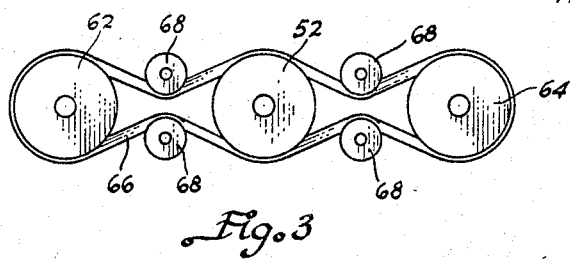
FIG. 3 is an enlarged transverse sectional view as seen on the line 3—3 of FIG. 2 and illustrating one embodiment of driving means for the agitator members of the multiple mixing compartment.

By referring to FIG. 9, it will be seen that an alternate drive mechanism for the agitating shafts is illustrated in the event it is not desired to use the exemplary mechanism shown in detail in FIG. 3. The principal difference of the arrangement shown in FIG. 9 over that shown in FIG. 3 is that no belt is employed in FIG. 9; rather, a pair of frictional drive wheels or gears 130 are employed respectively between the central clutch pulley 52 and the other clutch pulleys 62 and 64 respectively on opposite sides thereof. By such an arrangement, it will be seen that all of the clutch pulleys will be driven in the same radial direction. In the event the elements 130 are gears, appropriate mating gears or toothed portions resembling gears will have to be formed on the various clutch pulleys. In addition, it will be understood that a suitable supporting means will be provided for the rotatable elements 130, whether they are frictional drive wheels or gears.

In the embodiment shown especially in FIGS. 1 and 6 with respect to the flavoring material reservoirs 118, it is to be understood that said reservoirs, which are gravity-type, may be mounted at any other suitable location other than as shown in FIGS. 1 and 6, if desired, as long as the same are capable of feeding flavoring material by gravity.

Figure 10:
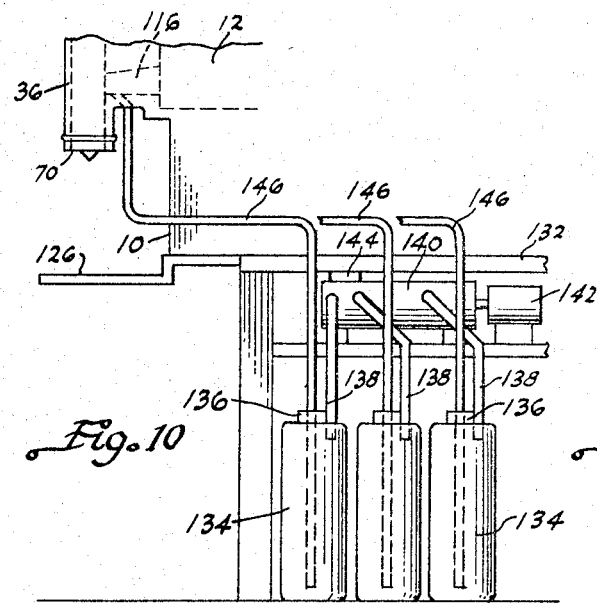
FIG. 10 is a fragmentary side elevation of another embodiment of supply means for flavoring material different from that shown in the embodiment illustrated in FIGS. 1 and 6.
Figure 11:
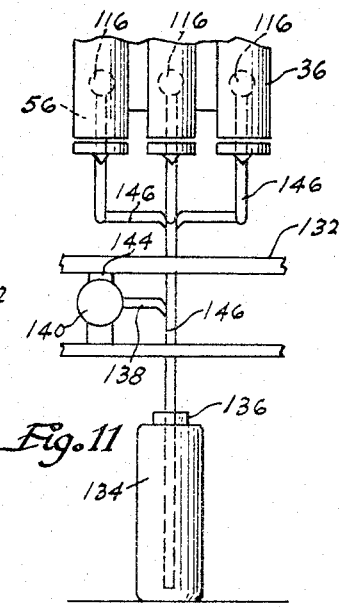
FIG. 11 is a fragmentary front elevation of the embodiment of flavor supply means shown in FIG. 10.

In the event it is not convenient or, for any other reason, it is not desired to provide gravity-type reservoirs for flavoring material, the present invention contemplates an additional embodiment which is illustrated in exemplary manner in FIGS. 10 and 11, wherein pressure-type delivery of flavoring material is contemplated. For convenience, the cabinet 10 may be mounted upon a suitable bench, counter, or table-type supporting means 132. A plurality of reservoirs 134, which may be standard type of glass jars, for example, are disposed in suitable arrangement below the table support 132 for example. The head or cap means 136 may be detachably connected to the reservoirs 134 if desired and each cap has a pressure inlet tube 138 by which air or other suitable gas, under pressure, is delivered to the interior of each reservoir, an appropriate air-pressure tank 140, for example. Connected to the air pressure tank 140 is an appropriate air or gas pump 142 of any suitable type and controlled, for example, by an exemplary switch 144 which is pressure-responsive, for example, and is connected to an electric motor or other means by which the pump is energized upon the pressure in tank 140 decreasing to a predetermined amount. Similarly, the pump motor is stopped when the pressure in tank 140 is raised again to a suitable predetermined upper limit.

Also extending through each head or cap means 136 is a flavor delivery tube 146, said tubes respectively communicating at the upper, delivery ends thereof, with one of the mixing compartments 56-60. If desired, and particularly as shown in FIG. 10, such delivery ends of the tubes communicate directly with the entrance passages 116 through which the neutral flavored confection material is delivered from the freezing chamber 12 to the mixing compartments 56-60, thereby insuring intimate and certain mixing of the flavoring material with the neutral confection material.

The lower ends of the flavor delivery tubes 146 extend downwardly into the flavoring material reservoirs 134 to within a short distance of the bottoms thereof, whereby the air or gas pressure is introduced into the upper portions of the reservoirs and causes pressure to be imposed against the upper surfaces of the flavoring materials in the reservoirs and thus force the same up through the delivery tubes 146 for discharge as described above.

The mixing mechanism of the present invention lends itself to blending neutral confection material with flavoring material to form either a homogeneous product or one having a marbleized effect. The difference is achieved by suitably regulating the speed of motor 60 which, preferably, is of the variable speed type through the use of a rheostat or the like, not shown. Such speed also is regulated in accord with the rate of feed of the neutral confection to the mixing compartments of the head and the rate of feed of the flavoring material thereto by regulating the valves 128. To facilitate such regulation, a suitable arrangement of control buttons and knobs may be employed on a panel on the front of a housing which preferably encloses the motor 50 and driving mechanism for the agitating members 76 for aesthetic purposes.

As an alternative to controlling the flow of neutral flavor confection material to the compartments 56-60 by means of the gate valves 84, a slightly different arrangement may be used comprising a vertically movable gate valve intersecting the entrance passages 116 to said compartments. Such valves are not shown specifically but readily can be visualized and preferably are operable by additional handled levers somewhat overlying handles 108 so as to operate such gate valves independently of the clutching of the agitating members 76 to their clutch pulleys. Accordingly, after a predetermined amount of neutral confection has been admitted to the selected mixing compartment, the gate valve then may be closed to cause the inlet feed to stop but without disengaging the agitating member from its clutch pulley, whereby more extended mixing of the segregated confection material in the mixing compartment may take place than by using the plunger and gate valves 84 and the actuating means therefor. Though the discharge ports 72 are open while such mixing is occurring with such alternate gate valve arrangement, the discharge through port 72 is not as rapid as with the preceding embodiment and consequent thorough blending of neutral confection and flavoring material results.

While the invention has been described and illustrated in its several preferred embodiments, it should be understood that the invention is not to be limited to the precise details herein illustrated and described since the same may be carried out in other ways falling within the scope of the invention as claimed.

I claim:

1. A mixing machine for frozen confection comprising a head attachable to a freezing unit to make a frozen confection of a substantially neutral flavor and contain the same at least in chilled condition until ready to have a selected flavor added thereto, said head comprising in combination, a plurality of mixing compartments, agitating means positioned within each compartment for operation therein, a plurality of reservoir means to hold individual flavoring material respectively communicating with one of said mixing compartments, each mixing compartment having entrance and exit means, inlet valve means associated with the entrance means of each mixing compartment to control the flow of neutral frozen confection thereto, means to control the flow of flavoring material to said mixing compartments from said flavor reservoir means, and power means connectable to said agitating means in said compartments to effect mixing of flavoring material with said substantially neutral confection to produce a freshly mixed confection of a desired flavor.

2. The mixing machine set forth in claim 1 further characterized by said agitating means being supported for rotation about the axes thereof within said compartments.

3. The mixing machine set forth in claim 1 further including means selectively and disengageably to connect said agitating means to said power means and said power means being a single means commonly connectable by said connecting means to any selected agitating means.

4. The mixing machine set forth in claim 3 further including means to actuate said inlet valve means to said compartments selectively to permit introduction of desired quantities of neutral frozen confection thereto for mixing of flavoring material thereinto, said means to connect said agitating and power means also actuating the inlet valve means to the selected mixing compartment.

5. The mixing machine set forth in claim 1 further characterized by said agitator means for each compartment being arranged to control the exit means thereof and mounted for axial movement in one direction to connect the agitating means to the power means incident to controlling the exit means of the selected compartment.

6. The mixing machine set forth in claim 1 further including flow control means interconnected to each flavoring material reservoir, and means to actuate said flow control means incident to a selected agitating means being connected to said power means.

7. The mixing machine according to claim 6 further characterized by said flavoring material reservoir means being at a level higher than the inlet to said mixing compartments therefrom, whereby delivery to said compartments is by gravity.

8. The mixing machine according to claim 6 further characterized by said flavoring material reservoir means being connected respectively to said mixing compartments by conduit lines, and including pressure means connected to said reservoir means and operable to force flavoring material by pressure through said conduit lines to said compartments.

9. The mixing machine set forth in claim 1 further including a plurality of drive shafts substantially corresponding in number to the mixing compartments, drive means arranged to connect said power means commonly to all of said drive shafts, and means operable selectively to effect connection of the agitating means of a selected compartment to one of said drive shafts.

10. The mixing machine according to claim 9 further characterized by said means to effect connection of said agitating means and drive shafts comprising a manually operable lever for each compartment engageable with the agitating means of its compartment and arranged to move the same axially and thereby cause connection thereof to one of said drive shafts.

11. The mixing machine according to claim 10 further characterized by the exit of each compartment being in the end thereof opposite that containing the end of the agitating means which is connected to the drive shaft therefor, said exit end of each compartment comprising a discharge opening and the machine also including closure means controlled by the agitator means and being moved to open position when said agitator means is connected to the drive shaft therefor.

12. The mixing machine according to claim 11 further including a closure valve carried by the end of each agitator means adjacent the discharge opening and engaging the same to close it when said agitating means is disconnected from the drive shaft therefor.

13. The mixing machine according to claim 12 further including inlet valve means controlling the feed of neutral confection to each mixing compartment, and comprising a valve member movable to open position incident to the agitating means in a selected compartment being moved into engagement with its drive shaft.

14. The mixing machine according to claim 13 further characterized by said inlet valve member being a gate-type valve slidably movable between open and closed positions.

15. The mixing machine according to claim 14 further characterized by said gate valves respectively being positioned adjacent one side of each mixing compartment adjacent the freezing unit to which the head of the mixing machine is attachable.

16. The mixing machine according to claim 14 further characterized by the gate valves comprising members complementary in shape to said mixing compartments and slidable axially therein relative to the inlet valve opening of each compartment.

17. The mixing machine according to claim 16 further including means interconnecting said valve member in each compartment to the rotatable agitating means therein for axial movement therewith but non-rotatable relative to said compartment.

18. The mixing machine set forth in claim 1 further including clutch means arranged to connect said power means selectively to one of said agitating means, and lever means manually operable and engageable with the clutch means of a selected agitating means to cause connection thereof with said power means.

19. The mixing machine set forth in claim 18 further including valve means to control the flow of flavoring material from the reservoirs therefor to said mixing compartments, and means arranged to be actuated by said lever means for said clutch means to actuate the valve means for the flavoring material for the selected mixing compartment to effect flow thereof incident to connecting the actuating means thereof to said power means.

20. The mixing machine according to claim 1 further characterized by said mixing compartments being cylindrical and having discharge end means thereon detachably connected to said compartments, said agitating means also being complementary in shape to said compartments and including shafts coaxial therewith, said machine also including means to retain said agitating means within the respective compartments but being disengageable from said agitating means to permit removal thereof from the discharge ends of said compartments when said discharge end means of said compartments are removed therefrom to permit convenient cleaning of said compartments and agitating means.

References Cited by the Examiner

UNITED STATES PATENTS 2,226,979 12/1940 Rahauser _____ 62—114
2,736,534 2/1956 Atkins _____ 259—8
3,224,740 12/1965 Kuehn et al. _____ 222—145 X WALTER A. SCHEEL, *Primary Examiner.*